United States Patent [19]
Bossaert et al.

[11] 3,805,225
[45] Apr. 16, 1974

[54] ACOUSTIC HOLOGRAPHY SYSTEM
[76] Inventors: Jean Bossaert; Jean Delorme; Joel Ernvein, all of 173, Bl. Haussmann, Paris 8 eme, France
[22] Filed: Aug. 10, 1972
[21] Appl. No.: 279,727

[30] Foreign Application Priority Data
Aug. 27, 1971 France .............................. 71.31185

[52] U.S. Cl................ 340/5 H, 73/67.5 H, 350/3.5
[51] Int. Cl............................................... G01s 9/66
[58] Field of Search ................ 340/1 R, 5 H, 5 MP; 73/67.5 H; 350/3.5

[56] References Cited
UNITED STATES PATENTS
3,564,904  2/1971  Brenden et al. .................... 340/5 H
3,493,073  2/1970  Wolfe et al. ........................ 340/5 H

*Primary Examiner*—Richard A. Farley
*Attorney, Agent, or Firm*—Cushman, Darby & Cushman

[57]  ABSTRACT

Acoustic holography system for imaging an object immersed in an ultrasonic tank, by means of an acoustic hologram of said object. The acoustic holography system in accordance with the invention comprises ultrasonic means for constructing the hologram; said ultrasonic means comprise an ultrasonic generator modulated at low frequency for reducing speckle in the reconstructed image. The invention is applicable to ultrasonic imaging for use in the fields of medicine and industry.

4 Claims, 1 Drawing Figure

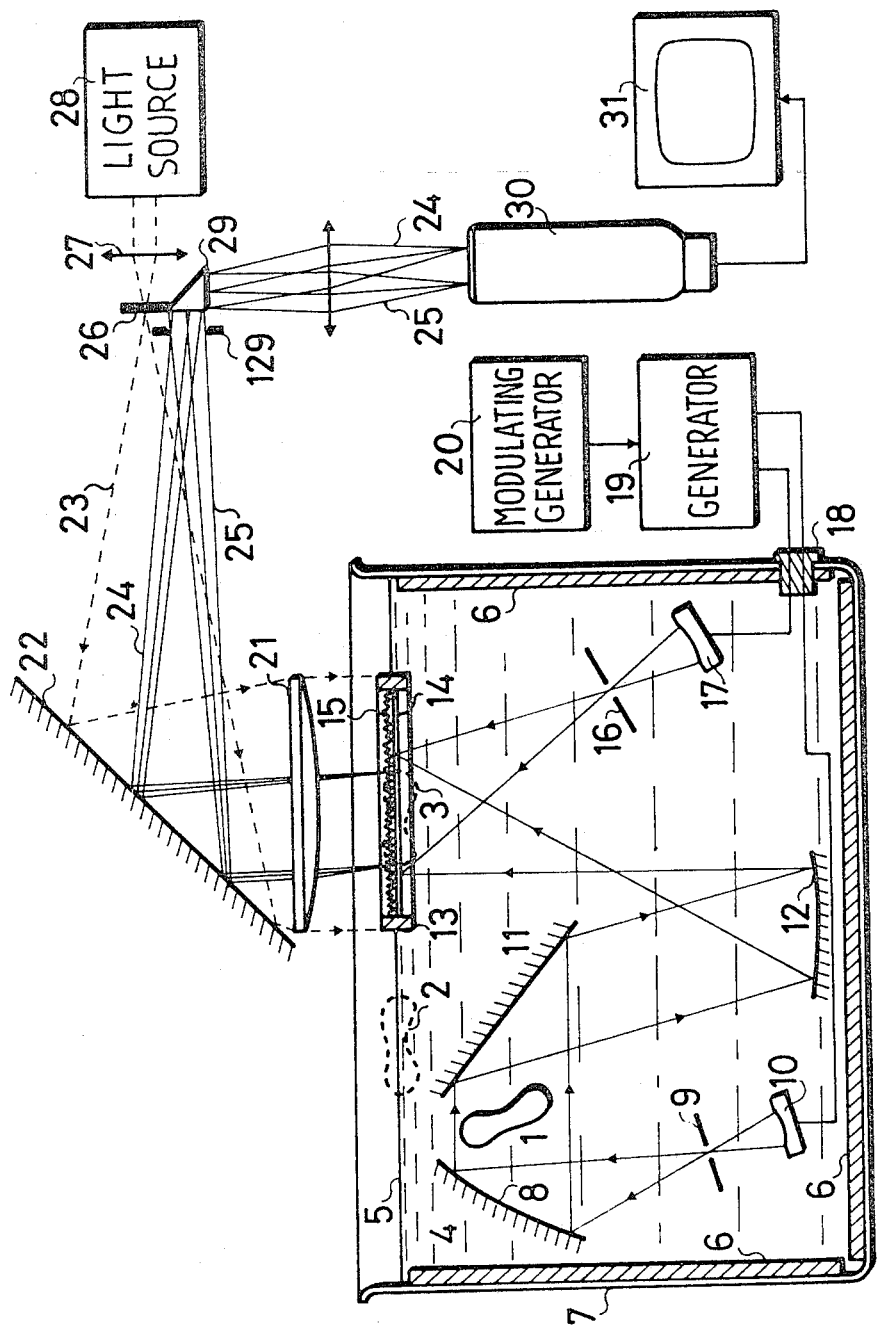

ACOUSTIC HOLOGRAPHY SYSTEM

The present invention relates to systems designed to produce a visible image of an object or a section thereof, by reconstructing with coherent illumination an acoustic hologram representing said object or said section. The invention relates more particularly to acoustic holography systems in which the acoustic construction of the hologram and its optical reconstruction, take place simultaneously.

A system of this kind is made up of an ultrasonic tank containing a liquid in which the object to be imaged is immersed; associated with this vessel there is an ultrasonic detector cell floating on the surface of the liquid. Through the interaction between an object beam radiation and a reference beam radiation, an acoustic hologram is produced in the form of the liquid surface deformation of the detector cell, an optical reconstruction system outside the ultrasonic tank is coupled to the reflecting surface of the detection cell and reconstructs a visible image of the object from the acoustic hologram.

The use of coherent light in the optical reconstruction system gives rise to speckle in the image of the object. This granulation phenomenon is a particular nuisance in the case of the optical reconstruction of acoustic holograms because that part of the light radiation diffracted by the hologram and used in the formation of the image, is selectively transmitted through a small aperture. Bearing in mind the substantial ratio between the acoustic and optical wavelengths, the optical selection of the effective diffracted radiation requires, for example, the use of an objective lens having a focal length of 1 metre, in the focal plane of which an optical transmission area not more than 1 millimetre wide is defined. Conditions of this kind are such as to produce a very grainy image with a pitch interval in excess of 1 millimetre.

The speckle in the image, which can be traced back to the optical reconstruction process, is in other words an extreme nuisance but the ultrasonic process of formation of the acoustic hologram is itself a cause of the production of unwanted speckle if the ultrasonic beams have relatively small apertures. The result is a net reduction in the quality of the images, due again to the coherent radiation used.

To these drawbacks, there must be added the fact that the ultrasonic radiation produced in the ultransonic tank can present irregularities of illumination as a consequence of imperfections in the electromechanical transducers used to emit them.

In order to overcome these multiple drawbacks, it is proposed hereinafter that the ultrasonic waves generated in the vessel be modulated at low frequency; this modulation in no way affects the reconstructed image but constantly changes the position of the speckle pattern so that because of retinal persistence or the persistence effect in the camera tubes, the grain effect is very much softened. This modulation can also produce a smoothing of the illumination provided by the ultrasonic beams.

In accordance with the invention, there is provided acoustic holography system for displaying the image of an object immersed in an ultrasonic tank, said sustem comprising: an ultrasonic detection cell arranged at the surface of the liquid contained in said tank, ultrasonic projection means for projecting the acoustic hologram of said object onto said ultrasonic detection cell, an ultrasonic generator feeding said ultrasonic projection means, and optical means for reconstructing said acoustic hologram; said ultrasonic generator having a modulation control input coupled to a low-frequency generator supplying an a.c. modulating voltage.

For a better understanding invention, the invention and to show how the same may be carried into effect, reference will be made to the ensuing description and the attached FIGURE which represents a system in accordance with the invention.

In the FIGURE, an ultrasonic tank 7 can be seen whose walls are lined with coatings 6 which absorb ultrasound. The tank 7 is filled with the liquid 4 at the surface 5 of which there is deposited an ultransonic detection cell 13, 14, 15 comprising an annular wall 13 carrying a thin stretched membrane or diaphragm 14. The top face of the diaphragm 14 is covered with an oil layer 15 whose surface constitutes the reflective output face of the detection cell; the bottom face of the diaphragm 14 is in contact with the liquid 4 and constitutes the input face of the detection cell. The input face receives ultrasonic radiation emitted by an electromechanical transducer 17 and filtered by a diaphragm 16; it also receives superimposed ultrasonic object beam radiation reflected by the mirror 12 and coming from an electromechanical transducer 10 after filtering by a diaphragm 9. The ultrasonic energy emerging from the hole in the diaphragm 9 is directed by a concave mirror 8 onto a flat mirror 11 which in turn directs it onto the mirror 12. The object 1 to which the acoustic hologram relates, is immersed between the mirrors 8 and 11 in order to produce acoustic modulation of the object radiation. From a consideration of the FIGURE, it will be seen that the mirror 11 produces a first ultrasonic image 2 of the object 1 and that the concave mirror 12 produces from said first image 2, a second ultrasonic image 3 which is projected, for example, at true size, onto the input face of the detection cell 13, 14, 15. The ultrasonic generator 19, through a sealed leadthrough 18, excites the transducers 10 and 17; these latter can emit continuously or in pulse fashion in accordance with a technique well known per se. Under the influence of the interference fringes created by the interaction between reference and object radiations, the pressure of the ultrasonic radiation distorts the surface of the oil film 15 causing the appearance there of a grating of wrinkles; this grating constitutes an acoustic hologram of the object 1 and, by reflection, can modulate the phase of a coherent optical radiation. The optical reconstruction of an image from the acoustic hologram materialised by the exit face of the detection cell 13, 14, 15, is achieved through the medium of a coherent light source 28 whose energy is focussed by a lens 27 onto a diaphragm with a very small pin-hole 26. The diveregent light beam 23 issuing from the diaphragm 26 is reflected by a mirror 22 onto a field lens 21 which converts it into the beam illuminating the acoustic hologram; the light rays received by the hologram are parallel and substantially normal to the exit face of the cell 13, 14, 15.

If the oil film 15 is not wrinkled by the ultrasonic signals coming from inside the vessel 7, it behaves as a flat mirror which reflects the light onto a point in the focal plane of the lens 21.

In contrast, if the surface of the oil film is wrinkled, only part of the reflected light energy is effective to form, at the setpoint, a central diffraction spot corresponding to the zero order of the grating of wrinkles; the remaining fractions of the light energy form, around said central spot, lateral diffraction spots corresponding respectively to the +1 and −1 diffraction orders of the grating of wrinkles. Each of these lateral spots contains the optical information relating to the image of the object 1. In order to pick up the information relating to one of the diffraction orders +1 or −1, in the FIgURE, a prism 29 has been shown associated with a selecting diaphragm 129; this selector system isolates the diffracted energy fraction belonging for example to the +1 order. The light which emerges from the prism 29 can be projected by a lens 40 onto the target of a camera tube 30 and the image thus projected can be displayed by means of a television receiver 31.

As far as the ultrasonic generator 19 is concerned, it is well known to utilise a generator which produces an alternating voltage of constant frequency whose amplitude is constant from one excitation phase to the next. If these operating conditions are adopted, the graininess of granulation of the image formed on the target of the tube 30 is fixed and very little indeed is needed for the beams 24 and 25 which correspond for example to the extreme points of the image 3, to miss the tiny input face of the prism 29. Then, images containing very objectionable speckle are produced.

To overcome this drawback, the invention provides for the use of a generator 19 having an input which enables the ultrasonic carrier waves to be frequency-modulated or amplitude-modulated. The modulating signal used is a low frequency signal produced by a second generator 20. The frequency of the modulating signal is made sufficiently high for the persistence of the image to have its smoothing effect upon the speckle; however, this frequency should be sufficiently low to enable the oil film to respond to the fluctuations produced by the modulation.

By way of a non-limitative example, an ultrasonic carrier frequency 5 MC/s frequency-modulated through a sweep of around 100KC/s at a recurrence frequency of around 30C/s, can be used.

The modulation of the ultrasonic waves by a low frequency signal has the effect of continuously changing the position of the speckle in the image. However, the image itself experiences no inputs from this modulation and there is no risk of it being blurred.

In other words, if we consider for example the case of frequency-modulation, then it will be seen that the ultrasonic waves will give rise to an acoustic hologram the wrinkles in which displace slightly and periodically in the plane of the exit face thereof. As intended, this gives rise to a continuous modification in the distribution of the speckle on the target of the camera tube and, since the target has integration properties, the rapid fluctuations due to the movement of the speckle are very much attenuated.

By contrast, as far as the image formed in the target is concerned, it can be shown that the variations in magnification brought about by the optical reconstruction of the modulated acoustic hologram, have no effect since the optical image is virtually coincidental with the section of the ultrasonic image 3 through the plane of the diaphragm 14. Since the the three-dimensional ultrasonic image 3 and its position are independent of the ultrasonic wavelength, the image projected onto the target of the tube 30 is essentially steady from the point of view of the minor modualtion to which the ultrasonic waves are subjected.

An additional advantage brought about by the modulation of the ultrasonic waves is that it means that acoustic speckle is less disturbing. Those skilled in the art will be aware, in other words, that acoustic speckle has a magnitude which vaires in opposition to the extent of the ultrasonic beams.

Another advantage introduced by the modulation of the ultrasonic waves, is concerned with the improvement in the ultrasonic illumination. We are dealing here with the cancellation of irregularities in the wavefronts emitted from the electromechanical transducers. This smoothing action is most marked when frequency-modulation is used, in view of the fact that in this case the frequency sweep is relatively large.

The improvements obtained by the low-frequency modulation of the ultrasonic waves are, of course, compatible with the technique of switching the light synchronously with the phases of ultrasonic excitation of the oil film. In this case, the generator 19 radiates ultrasonic wavetrains with a modulated carrier and a shutter syncronised with the wavetrains optically modulates the light transmitted to the target of the tube 30 or that used to illuminate the hologram.

What we claim is:

1. Acoustic holography system for displaying the image of an object immersed in an ultrasonic tank, said system comprising: an ultrasonic detection cell arranged at the surface of the liquid contained in said tank, ultrasonic projection means for projecting the acoustic hologram of said object onto said ultrasonic detection cell, an ultrasonic generator feeding an ultrasonic carrier wave to said ultrasonic projection means, and optical means using a coherent monochromatic radiation for reconstructing said acoustic hologram; said ultrasonic generator having a modulation control input coupled to a low-frequency a.c. generator; said a.c. generator modulating said ultrasonic carrier wave for reducing the speckle in the image reconstructed from said acoustic hologram.

2. System as claimed in claim 1, wherein said ultrasonic carrier wave is frequency modulated by said a.c. generator.

3. System as claimed in claim 1, wherein said ultrasonic carrier wave is made of ultrasonic pulsed wavetrains.

4. System as claimed in claim 1, wherein said ultrasonic carrier wave is amplitude modulated by said a.c. generator.

* * * * *